United States Patent
Banach et al.

(10) Patent No.: US 12,398,234 B2
(45) Date of Patent: Aug. 26, 2025

(54) POLY(ARYLENE ETHER) COMPOSITIONS

(71) Applicant: SHPP Global Technologies B.V., Bergen Op Zoom (NL)

(72) Inventors: Timothy Edward Banach, Scotia, NY (US); Eylem Tarkin-Tas, Delmar, NY (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 611 days.

(21) Appl. No.: 17/630,738

(22) PCT Filed: Jul. 31, 2020

(86) PCT No.: PCT/US2020/044493
§ 371 (c)(1),
(2) Date: Jan. 27, 2022

(87) PCT Pub. No.: WO2021/022156
PCT Pub. Date: Feb. 4, 2021

(65) Prior Publication Data
US 2022/0259369 A1 Aug. 18, 2022

(30) Foreign Application Priority Data
Jul. 31, 2019 (EP) .................. 19189450

(51) Int. Cl.
| C08G 18/48 | (2006.01) |
| C08G 18/08 | (2006.01) |
| C08G 18/10 | (2006.01) |
| C08G 18/61 | (2006.01) |
| C08G 101/00 | (2006.01) |

(52) U.S. Cl.
CPC ......... C08G 18/4879 (2013.01); C08G 18/10 (2013.01); C08G 18/14 (2013.01); C08G 18/61 (2013.01); *C08G 2101/00* (2013.01)

(58) Field of Classification Search
CPC .... C08G 18/4879; C08G 18/61; C08G 18/10; C08G 18/14
See application file for complete search history.

(56) References Cited

U.S. PATENT DOCUMENTS

| 3,375,228 A | 3/1968 | Holoch et al. |
| 3,383,340 A | 5/1968 | Maccallum et al. |
| 3,770,850 A | 11/1973 | White |
| 3,824,879 A | 7/1974 | Hansgen et al. |
| 4,148,843 A | 4/1979 | Goossens |
| 4,289,682 A | 9/1981 | Peters |
| 4,487,918 A | 12/1984 | Heitz et al. |
| 4,521,584 A | 6/1985 | Heitz et al. |
| 4,677,185 A | 6/1987 | Heitz et al. |
| 4,746,708 A | 5/1988 | Sybert |
| 4,806,602 A | 2/1989 | White et al. |
| 5,015,698 A | 5/1991 | Sybert et al. |
| 5,120,800 A | 6/1992 | Tsukahara et al. |
| 5,128,421 A | 7/1992 | Ohmura et al. |
| 5,164,421 A | 11/1992 | Kiamil et al. |
| 5,219,951 A | 6/1993 | Nelissen et al. |
| 5,242,990 A | 9/1993 | Arashiro et al. |
| 5,880,221 A | 3/1999 | Lisha et al. |
| 6,051,662 A | 4/2000 | Tracy et al. |
| 6,307,010 B1 | 10/2001 | Braat et al. |
| 6,384,176 B1 | 5/2002 | Braat et al. |
| 6,962,965 B2 | 11/2005 | Yeager |
| 7,276,563 B2 | 10/2007 | Ishii et al. |
| 7,541,421 B2 | 6/2009 | Carrillo et al. |
| 7,615,604 B2 | 11/2009 | Vergorgt et al. |
| 7,638,566 B2 | 12/2009 | Braidwood et al. |
| 7,671,167 B2 | 3/2010 | Carrillo et al. |
| 8,017,697 B2 | 9/2011 | Carrillo et al. |
| 8,703,848 B1 | 4/2014 | Peters |
| 9,169,368 B2 | 10/2015 | Peters |
| 9,266,997 B2 | 2/2016 | Peters |
| 9,296,916 B2 | 3/2016 | Peters et al. |
| 9,493,621 B2 | 11/2016 | Peters |
| 10,662,288 B2 * | 5/2020 | Tarkin-Tas ........... C08G 65/485 |
| 2001/0053820 A1 | 12/2001 | Yeager et al. |

(Continued)

FOREIGN PATENT DOCUMENTS

| CN | 104710603 A | 6/2015 |
| CN | 116082630 A | 5/2023 |

(Continued)

OTHER PUBLICATIONS

Extended European Search Report for European Application No. 19189450.0 dated Feb. 10, 2020, 5 pages.
International Search Report for International Application No. PCT/US2020/044493, International Filing Date Jul. 31, 2020, Date of Mailing Sep. 21, 2020, 5 pages.
Written Opinion for International Application No. PCT/US2020/044493, International Filing Date Jul. 31, 2020, Date of Mailing Sep. 21, 2020, 6 pages.
The extended European search report for the corresponding European Application No. 24171642.2; Filing Date: Apr. 22, 2024; Date of Mailing: Oct. 22, 2024; 5 pages.
International Preliminary Report On Patentability for the corresponding International Application PCT/US2020/044493, Date of Issuance: Feb. 1, 2022; 5 pages.

*Primary Examiner* — Michael L Leonard
(74) *Attorney, Agent, or Firm* — CANTOR COLBURN LLP

(57) ABSTRACT

A composition including a (poly)isocyanate compound and a capped poly(arylene ether) copolymer, wherein the capped poly(arylene ether) copolymer is derived from reacting a capping agent and an uncapped poly(arylene ether) copolymer comprising a phenolic end group, the uncapped poly(arylene ether) copolymer is the product of oxidative copolymerization of a monomer comprising a monohydric phenol, a dihydric phenol, or a combination thereof, and optionally a hydroxyaromatic terminated siloxane, and the capped poly(arylene ether) copolymer comprises an end group comprising an aliphatic alcohol.

20 Claims, No Drawings

(56) References Cited

U.S. PATENT DOCUMENTS

| | | |
|---|---|---|
| 2005/0187373 A1 | 8/2005 | Yeager |
| 2007/0135609 A1 | 6/2007 | Carrillo et al. |
| 2008/0071034 A1* | 3/2008 | Braidwood ......... C08F 283/085 |
| | | 525/392 |
| 2008/0071036 A1 | 3/2008 | Delsman et al. |
| 2008/0076843 A1 | 3/2008 | Clark |
| 2011/0152471 A1 | 6/2011 | Kamalakaran et al. |
| 2012/0009414 A1 | 1/2012 | Golini |
| 2012/0037410 A1* | 2/2012 | Amou ................... C08L 71/126 |
| | | 525/131 |
| 2012/0259086 A1 | 10/2012 | Yamashita et al. |
| 2015/0004341 A1 | 1/2015 | Peters |
| 2015/0038610 A1 | 2/2015 | Peters |
| 2015/0087736 A1 | 3/2015 | Peters |
| 2018/0126338 A1* | 5/2018 | Weber ................... C08G 18/61 |
| 2022/0259369 A1 | 8/2022 | Banach et al. |
| 2022/0282043 A1 | 9/2022 | Ebisawa |
| 2023/0115320 A1 | 4/2023 | Banach |
| 2023/0183477 A1 | 6/2023 | Tarkin-Tas et al. |

FOREIGN PATENT DOCUMENTS

| | | |
|---|---|---|
| CN | 116178658 A | 5/2023 |
| EP | 0248263 A2 | 12/1987 |
| EP | 0261574 A2 | 3/1988 |
| GB | 1330947 A | 9/1973 |
| JP | 2012015966 A | 1/2012 |

* cited by examiner

POLY(ARYLENE ETHER) COMPOSITIONS

CROSS REFERENCE TO RELATED APPLICATIONS

This application is a National Stage application of PCT/US2020/04493, filed Jul. 31, 2020, which claims priority to and benefit of European Patent Application No. 19189450.0, filed on Jul. 31, 2019 in the European Patent Office, the entire contents of which are incorporated by reference herein.

BACKGROUND

Poly(arylene ether) copolymers are a class of thermoplastics known for excellent water resistance, dimensional stability, and inherent flame retardancy, as well as outstanding dielectric properties over wide frequency and temperature ranges. Properties such as ductility, stiffness, chemical resistance, and heat resistance can be tailored by reacting thermosetting poly(arylene ether) copolymers with various crosslinking agents to meet requirements of a wide variety of end uses, for example, fluid engineering parts, electrical enclosures, automotive parts, and insulation for wire and cable. In particular, poly(arylene ether) copolymers have been used in thermoset compositions for electronics applications, where they provide improved toughness and dielectric properties, among other benefits.

Phenols such as uncapped poly(phenylene ether) (PPE) are used as blocking agents in polyurethanes particularly for coatings and adhesive applications. PPE blocking agents can provide polyurethane systems with reduced free isocyanates and extended storage stability by minimizing moisture sensitivity of the system. The phenolic end groups of a PPE blocking agent forms reversible bonds with isocyanates, where deblocking occurs at elevated temperatures. The reversible nature of these bonds, however, limits the use of phenolic PPE in final polyurethane products as they lack thermal stability. It would be an advantage if capped PPE copolymers could be used in final polyurethane products to impart improved properties, including lower moisture absorption, increased glass transition temperature ($T_g$), and improved tear strength, chemical resistance, and flame retardancy.

BRIEF DESCRIPTION

Polyurethanes are generally prepared by reacting a polyol with a (poly)isocyanate, typically in the presence of a catalyst. For stability during preparation, the (poly)isocyanates can be blocked with a blocking agent, in which at least one isocyanate group has reacted with a protecting or blocking agent to form a derivative (also referred to as a "blocked poly(isocyanate)") that can dissociate on heating to remove the protecting or blocking agent (also referred to a de-blocking) and release the reactive isocyanate group. The reactive isocyanate group can subsequently react with the polyol to achieve polymerization of the polyurethane. However, the nature of the blocking chemistry can require both heating and longer reaction times in order to proceed. In sheet applications, polyurethane coatings can be applied to a flat or gently curved final part prepared by injection molding or thermoforming by flow or dip coating that are performed under conditions to minimize deblocking prior to curing, followed by curing with either heat or irradiation. For thermoplastic polyurethanes, the thermopolymer can be formed into a shape and then post-coated and cured to create the end product for a given application. These techniques have the disadvantage of being time intensive because the blocking chemistry of the (poly)isocyanates is inherently slow. For processes such as dip-coating, there is further added time required to apply the coating to the substrate before curing is even initiated.

Phenolic compounds such as uncapped poly(phenylene ether) (PPE) copolymers can be used as blocking agents in polyurethanes to reduce free isocyanate groups and provide extended storage stability. In addition, the uncapped PPE copolymers can react with the isocyanate groups under particular conditions, such that the uncapped PPE copolymer can be incorporated into the structure of the final polyurethane product. The phenolic end groups of the uncapped PPE copolymer can form reversible bonds with isocyanate groups of the (poly)isocyanate, which makes the uncapped PPE copolymer useful as a blocking agent because deblocking occurs at elevated temperatures. However, the reversible nature of these bonds also can limit the use of uncapped PPE copolymers in polyurethane compositions where the uncapped PPE copolymer reacts as a polyol with the isocyanate groups during polymer formation, since the thermal stability of the bonds formed between the phenolic hydroxyl groups and the isocyanate groups is limited, and thus the thermal stability of the final polyurethane product similarly is limited, especially at higher temperatures.

In overcoming the limitations of uncapped PPE copolymers in these types of polyurethane compositions, the present inventors have discovered that a capped poly(arylene ether) copolymer including aliphatic hydroxyl end caps (also referred to as end groups) can be used instead of the uncapped PPE copolymer. The aliphatic alcohol groups of the capped poly(arylene ether) copolymer advantageously react to form thermally robust bonds with the isocyanate groups of the (poly)isocyanate and the resulting polyurethane products have increased thermal stability compared to the polyurethane products incorporating the uncapped PPE copolymer, where the bonding between the phenolic hydroxyl groups of the uncapped PPE copolymer and the isocyanate groups of the (poly)isocyanate are thermally reversible at about 170° C. The capped poly(arylene ether) copolymer are therefore useful in (poly)isocyanate compositions because they form thermally stable polyurethane products. In addition, Applicants have discovered that the incorporation of the capped poly(arylene ether) copolymer into the polyurethane products also achieves improved Shore D hardness, tensile stress, tear strength, compressive strength, and solvent resistance over comparable polyurethane products prepared from compositions that did not include the capped poly(arylene ether) copolymer.

According to an aspect, a composition including a (poly)isocyanate compound and a capped poly(arylene ether) copolymer is provided, wherein the capped poly(arylene ether) copolymer derived from reacting a capping agent and an uncapped poly(arylene ether) copolymer comprising a phenolic end group, and the uncapped poly(arylene ether) copolymer is the product of oxidative copolymerization of a monomer including a monohydric phenol, a dihydric phenol, or a combination thereof, and optionally a hydroxyaromatic terminated siloxane, and the capped poly(arylene ether) copolymer comprises an end group comprising an aliphatic alcohol.

Also provided is a process for forming the capped poly(arylene ether) copolymer including reacting a capping agent and an uncapped poly(arylene ether) copolymer including a phenolic end group under conditions effective to provide a reaction mixture including the capped poly (arylene ether) copolymer.

A product prepared from the composition is also provided, preferably a thermoplastic polyurethane, a polyurethane foam, a polyisocyanurate foam, or a combination thereof.

The above described and other features are exemplified by the following figures and detailed description.

DETAILED DESCRIPTION

The present inventors have determined that poly(arylene ethers) having aliphatic alcohol end groups (end caps) can be used in polyurethane compositions. Provided is a composition comprising a (poly)isocyanate compound and a capped poly(arylene ether) copolymer, wherein the capped poly(arylene ether) copolymer is derived from reacting a capping agent and an uncapped poly(arylene ether) copolymer comprising a phenolic end group, and the uncapped poly(arylene ether) copolymer is the product of oxidative copolymerization of a monomer comprising a monohydric phenol, a dihydric phenol, or a combination thereof, and optionally a hydroxyaromatic terminated siloxane, and the capped poly(arylene ether) copolymer comprises end group comprising an aliphatic alcohol.

As used herein, an "end group comprising an aliphatic alcohol" refers to a $C_{1-30}$ organic group comprising a hydroxy group directly connected to an aliphatic carbon atom in the end group. Exemplary end groups can be derived from ethylene carbonate, propylene carbonate, ethylene oxide, propylene oxide, 2-bromoethanol, or the like, or a combination thereof, as disclosed herein.

The capped poly(arylene ether) copolymer is of formula (1)

$$Q(J-D)_y \qquad (1)$$

wherein Q is derived from the monohydric phenol or the dihydric phenol, and optionally the hydroxyaromatic terminated siloxane. In the capped poly(arylene ether) copolymer of formula (1), group J can have the structure of formula (2)

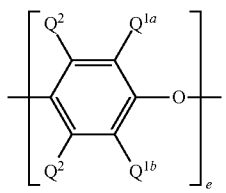

(2)

wherein $Q^{1a}$ is $C_1$-$C_{12}$ primary or secondary alkyl or cycloalkyl, preferably $C_1$-$C_{12}$ primary alkyl, more preferably $C_1$-$C_6$ primary alkyl, even more preferably methyl; $Q^{1b}$ is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms, preferably $C_1$-$C_{12}$ alkyl or $C_3$-$C_{12}$ cycloalkyl, more preferably $C_1$-$C_6$ alkyl, even more preferably methyl. Each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms, preferably hydrogen; and e is 1 to 200, preferably 1 to 100; and y is 1 or 2, preferably 2.

In formula (1), D is an end group comprising the aliphatic alcohol. For example, each D independently can be substituted or unsubstituted $C_2$-$C_{30}$ hydroxyhydrocarbyl, substituted or unsubstituted $C_3$-$C_{30}$ hydroxyhydrocarbylcarbonyl, substituted or unsubstituted $C_4$-$C_{30}$ hydroxy-terminated poly($C_2$-$C_4$ alkylene ether), or $C_5$-$C_{30}$ hydroxy-terminated poly($C_2$-$C_4$ alkylene ether)carbonyl, provided that the hydroxy group is directly connected to an aliphatic carbon atom. For example, D can be substituted or unsubstituted $C_1$-$C_{10}$ hydroxyalkyl, substituted or unsubstituted $C_3$-$C_{10}$ hydroxyalkenyl, substituted or unsubstituted $C_5$-$C_{10}$ hydroxycycloalkyl, substituted or unsubstituted $C_7$-$C_{13}$ hydroxyalkylaryl, substituted or unsubstituted $C_2$-$C_{10}$ hydroxyalkylcarbonyl, substituted or unsubstituted $C_8$-$C_{14}$ hydroxyalkylarylcarbonyl, substituted or unsubstituted $C_4$-$C_{10}$ hydroxy-terminated poly($C_2$-$C_4$ alkylene ether), or substituted or unsubstituted $C_5$-$C_{11}$ hydroxy-terminated poly ($C_2$-$C_4$ alkylene ether)carbonyl, provided that the hydroxy group is directly connected to an aliphatic carbon atom. Preferably, D can be unsubstituted $C_1$-$C_4$ hydroxyalkyl, unsubstituted $C_5$-$C_9$ hydroxyalkylcarbonyl, unsubstituted hydroxy-terminated $C_4$-$C_8$ poly($C_2$-$C_4$ alkylene ether), or unsubstituted hydroxy-terminated $C_5$-$C_9$ poly($C_2$-$C_4$ alkylene ether)carbonyl, provided that the hydroxy group is directly connected to an aliphatic carbon atom.

The dihydric phenol has two hydroxy groups bound directly to the same aromatic ring or to two different aromatic rings within the same molecule. The dihydric phenol can have the structure of formula (3)

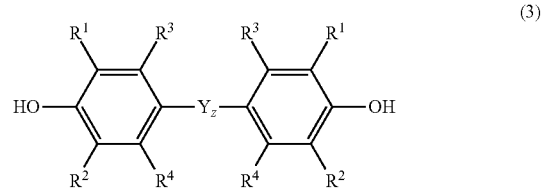

(3)

wherein each occurrence of $R^1$, $R^2$, $R^3$, and $R^4$ is the same or different and is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms, preferably hydrogen, halogen, or $C_1$-$C_{12}$ alkyl, more preferably hydrogen or $C_1$-$C_6$ alkyl; z is 0 or 1, preferably 1.

In formula (3), group Y is a divalent linking group having one of the formulas

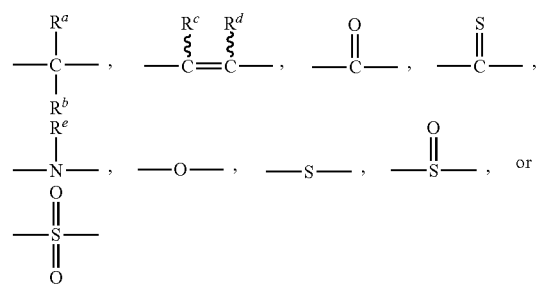

wherein each occurrence of $R^a$, $R^b$, $R^c$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^c$ and $R^d$ together are a $C_4$-$C_{12}$ cycloalkylene group. For example, the dihydric phenol can be 2,2-bis(3,5-dimethyl-4-hydroxyphenol)propane. When z is 0, the two aryl groups are connected by a single bond.

Examples of dihydric phenols include 3,3',5,5'-tetramethyl-4,4'-biphenol, 2,2-bis(3-methyl-4-hydroxyphenyl)propane, 2,2-bis(3,5-dimethyl-4-hydroxyphenyl)propane, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, bis(4-hydroxyphenyl)phenylmethane, 2,2-bis(4-hydroxy-3-methylphenyl)propane, 1,1-bis(4-hydroxy-3-methylphenyl)cyclohexane, 1,1-bis(4-hydroxy-3,5-dimethylphenyl)cyclopentane, 1,1-bis(4-hydroxy-3,5-dimethylphenyl)cyclohexane, 1,1-bis(4-hydroxy-3-methylphenyl)cycloheptane, 1,1-bis(4-hydroxy-3,5-dimethylphenyl)cycloheptane, 1,1-bis(4-hydroxy-3-methylphenyl)cyclooctane, 1,1-bis(4-hydroxy-3,5-dimethylphenyl)cyclooctane, 1,1-bis(4-hydroxy-3-methylphenyl)cyclononane, 1,1-bis(4-hydroxy-3,5-dimethylphenyl)cyclononane, 1,1-bis(4-hydroxy-3-methylphenyl)cyclodecane, 1,1-bis(4-hydroxy-3,5-dimethylphenyl)cyclodecane, 1,1-bis(4-hydroxy-3-methylphenyl)cycloundecane, 1,1-bis(4-hydroxy-3,5-dimethylphenyl)cycloundecane, 1,1-bis(4-hydroxy-3-methylphenyl)cyclododecane, 1,1-bis(4-hydroxy-3,5-dimethylphenyl)cyclododecane, 1,1-bis(4-hydroxy-3-t-butylphenyl)propane, 2,2-bis(4-hydroxy-2,6-dimethylphenyl)propane, 2,2-bis(4-hydroxy-3-bromophenyl)propane, 1,1-bis(4-hydroxyphenyl)cyclopentane, 1,1-bis(4-hydroxyphenyl)cyclohexane, 2,2',6,6'-tetramethyl-3,3',5,5'-tetrabromo-4,4'-biphenol, 2,2',5,5'-tetramethyl-4,4'-biphenol, or a combination thereof. For example, the dihydric phenol includes 2,2-bis(3,5-dimethyl-4-hydroxyphenol)propane.

The monohydric phenol can have the structure of formula (4)

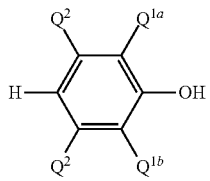

(4)

wherein $Q^{1a}$, $Q^{1b}$, and $Q^2$ are as defined above in formula (2). For example, $Q^{1a}$ is methyl or cyclohexyl, and $Q^{1b}$ is halogen, unsubstituted $C_1$-$C_{12}$ alkyl provided that the alkyl group is not tertiary alkyl, or unsubstituted $C_1$-$C_{12}$ aryl. Exemplary monohydric phenols include 2,6-dimethylphenol, 2-methylphenol, 2,5-dimethylphenol, 2-allyl-6-methylphenol, 2,3,6-trimethylphenol, 2-methyl-6-phenyl phenol, 2-cyclohexyl-6-methylphenol, or a combination thereof. For example, the monohydric phenol includes 2,6-dimethylphenol.

The hydroxyaromatic terminated siloxane can have the structure of formula (5)

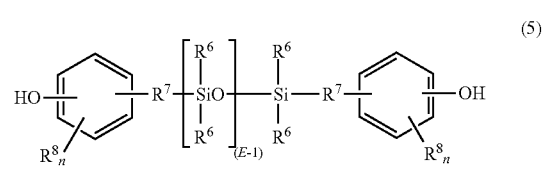

(5)

wherein each $R^6$ is independently hydrogen, a $C_{1-14}$ hydrocarbyl, a $C_{1-14}$ halohydrocarbyl, or a $C_{1-14}$ heterohydrocarbyl, preferably $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkyl, $C_{7-13}$ arylalkylenoxy, $C_{7-13}$ alkylaryl, or $C_{7-13}$ alkylaryloxy; each $R^7$ is a $C_{1-6}$ hydrocarbylene group, preferably a divalent $C_{2-8}$ aliphatic group, more preferably dimethylene, trimethylene, or tetramethylene; each $R^8$ is the same or different, and is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each n is independently an integer of 0 to 4; and E is, on average, 2 to 200, 2 to 125, 5 to 125, 5 to 100, 5 to 50, 20 to 80, 10 to 60, or 5 to 20.

For example, the hydroxyaromatic terminated siloxane can have the structure of formula (5a)

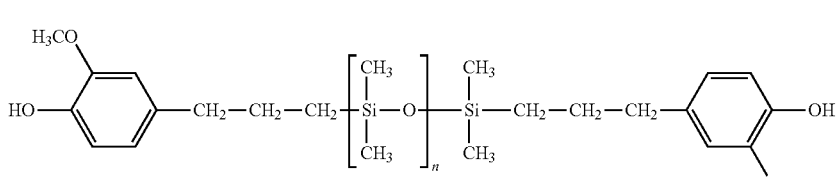

(5a)

wherein n is, on average, 5 to 100, specifically 10 to 60.

The capped poly(arylene ether) copolymer can have a structure of formula (6) or (7):

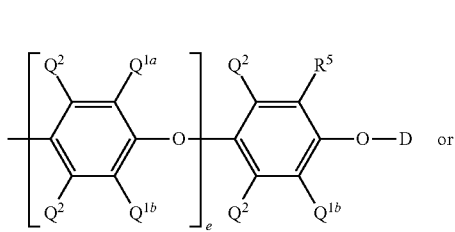

(6)

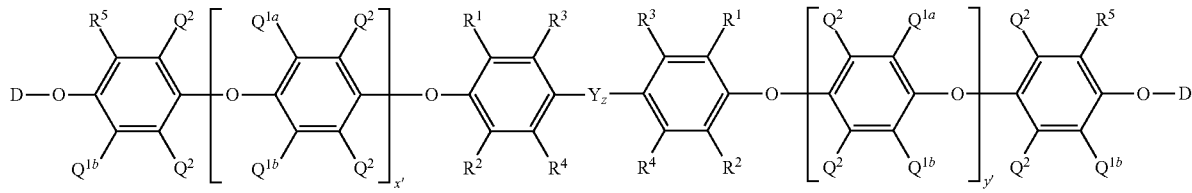

(7)

wherein each occurrence of $Q^{1a}$, $Q^{1b}$ and $Q^2$ are independently as defined above. Each occurrence of $R^1$, $R^2$, $R^3$, and $R^4$ is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. Each occurrence of $R^5$ is independently $Q^{1a}$ or a $(C_1$-$C_6$-hydrocarbyl) $(C_1$-$C_6$-hydrocarbyl)aminomethylene group; x' and y' represent the number of repeat units, and hence the relative mole ratios, of the arylene ether units wherein x' and y' are each independently 0 to 50, provided that the sum of x' and y' is at least 2; or e is the number of repeating units of the arylene ether unit and e is 1 to 200, preferably 1 to 100; z is 0 or 1. For example, x' and y' can be independently 0 to 30.

Each group D in formulas (6) or (7) is an end group comprising an aliphatic alcohol as disclosed for formula (1).

In formula (7), group Y is a divalent linking group of the formula

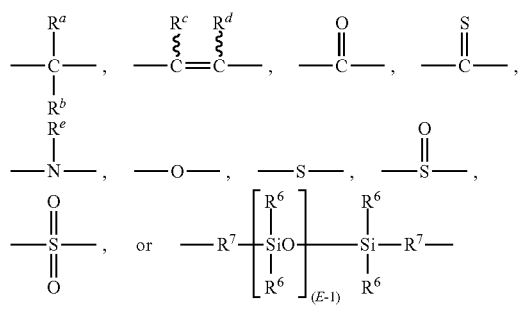

wherein each occurrence of $R^a$, $R^b$, $R^c$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^c$ and $R^d$ together are a $C_4$-$C_8$ alkylene group, each occurrence of $R^6$ is independently hydrogen, a $C_{1-14}$ hydrocarbyl, a $C_{1-14}$ halohydrocarbyl, or a $C_{1-14}$ heterohydrocarbyl, preferably $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkyl, $C_{7-13}$ arylalkoxy, $C_{7-13}$ alkylaryl, or $C_{7-13}$ alkylaryloxy, each $R^7$ is a $C_{1-6}$ hydrocarbylene group, preferably a divalent $C_{2-8}$ aliphatic group, more preferably dimethylene, trimethylene, or tetramethylene, and E is, on average, 2 to 200, 2 to 125, 5 to 125, 5 to 100, 5 to 50, 20 to 80, 10 to 60, or 5 to 20.

For example, the capped poly(arylene ether) copolymer is of the formula (7a)

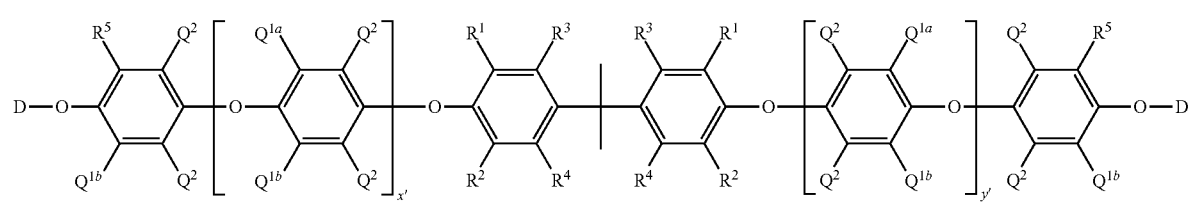

(7a)

wherein $Q^{1a}$, $Q^{1b}$, $Q^2$, $R^1$, $R^2$, $R^3$, $R^4$, $R^5$, D, x', and y' are as defined above.

The capped poly(arylene ether) copolymer can have a number average molecular weight ($M_n$) of 400 to 2,500 grams per mole (g/mol) and a weight average molecular weight ($M_w$) of 500 to 6,000 g/mol, each as determined by gel permeation chromatography (GPC). For example, the capped poly(arylene ether) copolymer can have a number average molecular weight ($M_n$) of 400 to 2,200 g/mol or 800 to 1,600 g/mol and a weight average molecular weight ($M_w$) of 600 to 5,000 g/mol or 800 to 4,500 g/mol, each as determined by GPC.

The capped poly(arylene ether) copolymer can have an average of 1.5 to 5 hydroxy groups per molecule, preferably 1.5 to 3.1, and more preferably 1.5 to 2.1. For example, the capped poly(arylene ether) copolymer can be a poly(arylene ether) copolymer in which at least 75%, preferably at least 90%, yet more preferably at least 95%, even more preferably at least 99% of the free hydroxyl groups (e.g., phenols) of the corresponding uncapped poly(arylene ether) copolymer have been functionalized by reaction with a capping agent.

The capped poly(arylene ether) copolymer can have an intrinsic viscosity of 0.04 to 0.15 deciliter per gram (dL/g) as measured at 25° C. in chloroform. For example, the intrinsic viscosity is preferably 0.06 to 0.1 dL/g, more preferably 0.075 to 0.090 dL/g.

The capped poly(arylene ether) copolymer is the product of oxidative copolymerization of a monomer comprising a monohydric phenol, a dihydric phenol, or a combination thereof, and optionally a hydroxyaromatic terminated siloxane, to form an uncapped poly(arylene ether) copolymer, and subsequent reaction with a capping agent to form the capped poly(arylene ether) copolymer.

The uncapped poly(arylene ether) copolymer can be formed by polymerization of monomers, for example including monohydric phenol and dihydric phenol, by continuous addition of oxygen to a reaction mixture including the monomers, optionally a solvent, and a polymerization catalyst. The molecular oxygen ($O_2$) can be provided as air or pure oxygen. The polymerization catalyst can be a metal complex, i.e. a metal catalyst, including a transition metal cation, including cations from Group VIB, VIIB, VIIIB, or IB of the periodic table, or a combination thereof. The catalyst can include a metal cation such as chromium, manganese, cobalt, copper, or combination thereof and an anion such as chloride, bromide, iodide, sulfate, acetate, propionate, butyrate, laurate, palmitate, benzoate, or a combination of one or more of these anions, and optionally one or more charge-neutral ligands such as water, amines, phosphines, CO, or the like. Alternatively, a metal or metal oxide and an inorganic acid, organic acid, or an aqueous solution of such an acid can be combined to form a corresponding metal salt or hydrate in situ. For example, cuprous oxide and hydrobromic acid can be combined to generate cuprous bromide in situ.

Exemplary amine ligands can be, for example, a monoamine, an alkylene diamine, or a combination thereof. Monoamines include dialkylmonoamines (such as di-n-butylamine) and trialkylmonoamines (such as N,N-dimethylbutylamine). Exemplary monoamines include di-n-butylamine, n-butylethylamine, di-tert-butylamine, tert-butylethylamine, dimethylamine, di-n-propylamine, di-sec-butyl amine, dipentylamine, dihexylamine, dioctylamine, didecylamine, dibenzylamine, methylethylamine, methylbutylamine, dicyclohexylamine, N-ethylaniline, N-butyl aniline, N-methyl-2-methylaniline, N-methyl-2,6-dimethylaniline, diphenylamine, or a combination thereof. Exemplary diamines include a N,N'-di-tert-butylethylenediamine, or the like, and combinations thereof. Exemplary trialkylmonoamines include trimethylamine, triethylamine, tripropylamine, tributylamine, butyldimethylamine, phenyldiethylamine, or the like, and combinations thereof.

When the amine ligand includes a secondary amine such as di-n-butylamine, some of the secondary amine can be chemically incorporated into the uncapped poly(arylene ether) copolymer at the benzylic position of terminal monohydric phenol units. The covalently bound monoamine groups can be present as aminomethyl groups ortho to the phenol oxygen in terminal units as shown below:

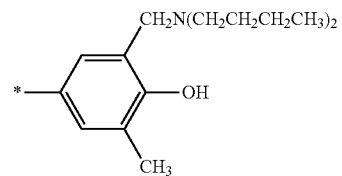

The amount of covalently bound monoamine groups can be determined by $^1$H-NMR spectroscopy. Covalently bound monoamine groups can adversely affect the oxidative stability of capped poly(arylene ether) copolymer and can result in yellowing of the capped poly(arylene ether) copolymer upon heat aging.

The uncapped poly(arylene ether) copolymer can be of formulas (8) or (9)

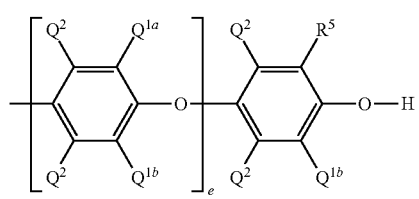

(8)

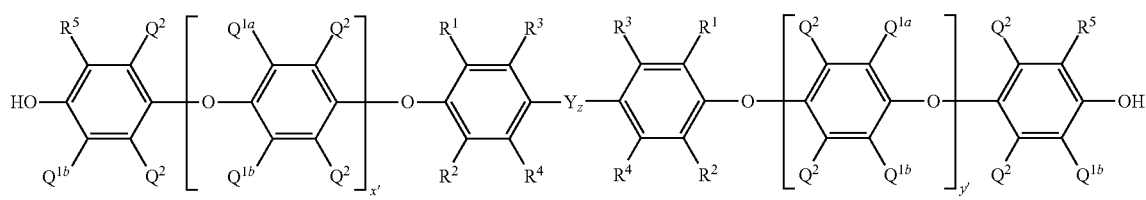

(9)

wherein $Q^{1a}$, $Q^{1b}$, $Q^2$, $R^1$, $R^2$, $R^3$, $R^4$, $R^5$, Y, e', y', and z are as described above. In formulas (8) and (9), each occurrence of $R^5$ is independently $Q^1a$ or a ($C_1$-$C_6$-hydrocarbyl)($C_1$-$C_6$-hydrocarbyl)aminomethylene group. In an aspect, 1 to 500 parts per million by weight (ppm), or 50 to 1,000 ppm, or 50 to 3,000 ppm of the $R^5$ groups are ($C_1$-$C_6$-hydrocarbyl)($C_1$-$C_6$-hydrocarbyl)aminomethylene groups, based on the total parts by weight of the copolymer.

In formulas (8) and (9), x' and y' represent the number of repeat units, and hence when taken together define the relative mole ratios of the respective arylene ether repeat units. For example, x' and y' are each independently 0 to 50, provided that the sum of x' and y' is at least 2, for example 4 to 53. For example, the sum of x' and y' is 8 to 20, preferably 8 to 15, more preferably 8 to 10. The uncapped poly(arylene ether) copolymer can be prepared from a monomer mixture that comprises 80 to 99 parts by weight of the monohydric phenol and 1 to 20 parts by weight of the dihydric phenol. Within this range, the uncapped poly (arylene ether) copolymer can be prepared from 85 to 95 parts by weight of the monohydric phenol and 5 to 15 parts by weight of the dihydric phenol, based on the total weight of the monohydric phenol and the dihydric phenol.

The uncapped poly(arylene ether) copolymer can have an $M_n$ of 300 to 25,000 g/mol, as determined by Gel Permeation Chromatography (GPC). For example, the uncapped poly (arylene ether) copolymer can have an $M_n$ of 300 to 10,000 g/mol, specifically 300 to 8,000 g/mol, 300 to 5,000 g/mol, or 300 to 2,500 g/mol, as determined by GPC.

The capped poly(arylene ether) copolymer is formed by the reaction of an uncapped poly(arylene ether) copolymer including a phenolic end group under conditions effective to provide a reaction mixture including the capped poly(arylene ether) copolymer.

The capping agent can be one or more compounds of the formulas (10), (11), (12), and (13):

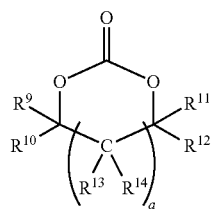
(10)

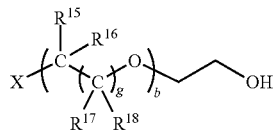
(11)

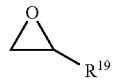
(12)

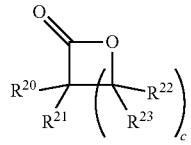
(13)

wherein $R^9$ to $R^{12}$, $R^{20}$, and $R^{21}$ are each independently hydrogen, $C_1$-$C_{12}$ primary alkyl, $C_{2-12}$ alkenyl, $C_7$-$C_{12}$ arylalkyl, $C_2$-$C_{12}$ alkoxyalkyl, $C_7$-$C_{12}$ aryloxyalkyl, or $C_1$-$C_{12}$ hydroxyalkyl, preferably hydrogen or $C_{1-6}$ alkyl. Each occurrence of $R^{13}$, $R^{14}$, $R^{22}$, and $R^{23}$ is independently hydrogen, $C_1$-$C_{12}$ primary alkyl, $C_7$-$C_{12}$ arylalkyl, $C_2$-$C_{12}$ alkoxyalkyl, $C_7$-$C_{12}$ aryloxyalkylene, or $C_1$-$C_{12}$ hydroxyalkyl, preferably hydrogen or $C_{1-6}$ primary alkyl. Each occurrence of $R^{15}$ to $R^{18}$ is independently hydrogen or methyl, preferably hydrogen. $R^{19}$ is hydrogen or $C_1$-$C_{18}$ primary alkyl, preferably hydrogen or $C_{1-6}$ hydrogen. X is halogen, preferably Br. In formulas (10)-(13), a is 0 or 1; b is 0 to 10, preferably 0 to 6, more preferably 0 to 3; c is 0 to 3, preferably 1 to 3; and g is 1 or 2, preferably 1.

Methods of reacting an uncapped poly(arylene ether) with a capping agent are described, for example, in U.S. Pat. No. 3,375,228 to Holoch et al.; U.S. Pat. No. 4,148,843 to Goossens, U.S. Pat. No. 4,806,602 to White et al.; U.S. Pat. No. 5,219,951 to Nelissen et al.; U.S. Pat. No. 6,384,176 to Braat et al; U.S. Patent Application Publication No. 2001/0053820 A1 to Yeager et al.; and European Patent No. 261,574 B1 to Peters et al.

A capping catalyst may be employed in the reaction of an uncapped poly(arylene ether) with a capping agent. Examples of such compounds, including those known to the art, which are capable of catalyzing condensation of phenols with the capping agents described above. For example, the capping catalyst can be a hydroxide salt such as sodium hydroxide, potassium hydroxide, tetraalkylammonium hydroxides, or the like; tertiary alkylamines such as tributyl amine, triethylamine, dimethylbenzylamine, dimethylbutylamine, or the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino)pyridine, 4-(1-pyrrolino)pyridine, 4-(1-piperidino)pyridine, 2-vinylpyridine, 3-vinylpyridine, 4-vinylpyridine, or the like.

Alternatively, the capping catalyst can be a transesterification catalyst that is capable of catalyzing transesterification of phenols with the capping agents described above may be used. For example, the capping catalyst can be a catalyst that includes a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other transesterification catalysts include alkali or alkaline earth metal salts of carbonate, such as $Cs_2CO_3$, $NaHCO_3$, and $Na_2CO_3$, or the like, non-volatile inorganic acid such as $NaH_2PO_3$, $NaH_2PO_4$, $Na_2HPO_3$, $KH_2PO_4$, $CsH_2PO_4$, $Cs_2HPO_4$, or the like, or mixed salts of phosphoric acid, such as $NaKHPO_4$, $CsNaHPO_4$, $CsKHPO_4$, or the like. Combinations of the foregoing catalysts can be used.

The capping catalyst may alternatively be a transesterification catalyst that includes a quaternary ammonium compound, a quaternary phosphonium compound, or a combination thereof. The quaternary ammonium compound can be a compound of the structure $(R^{14})_4N^+X^-$, wherein each $R^{14}$ is the same or different, and is a $C_1$-$C_{20}$ alkyl, a $C_4$-$C_{20}$ cycloalkyl, or a $C_4$-$C_{20}$ aryl; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations thereof. For example, tetramethyl ammonium hydroxide can be used. The quaternary phosphonium compound can be a compound of the structure $(R^{15})_4P^+X^-$, wherein each $R^{15}$ is the same or different, and is a $C_1$-$C_{20}$ alkyl, a $C_4$-$C_{20}$ cycloalkyl, or a $C_4$-$C_{20}$ aryl; and $X^-$ is an organic or inorganic anion, for example a hydroxide, phenoxide, halide, carboxylate such as acetate or formate, sulfonate, sulfate, formate, carbonate, or bicarbonate. Where $X^-$ is a polyvalent anion such as carbonate or sulfate it is understood that the positive and negative charges in the quaternary ammonium and phosphonium structures are balanced. For example, where $R^{14}$ or $R^{15}$ are each methyl and $X^-$ is carbonate, it is understood that $X^-$ is $\frac{1}{2}(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations thereof. For example, TBPA can be used.

The capping reactions can be performed with or without a solvent, depending on the capping agent. Exemplary solvents include aromatic hydrocarbons such as toluene or xylene, or chlorinated aromatic hydrocarbons such as chlorobenzene, o-dichlorobenzene, or 1,2,4-trichlorobenzene. For example, the solvent includes toluene.

The process can further include isolating the capped poly(arylene ether) copolymer from the reaction mixture. Suitable methods include precipitation and total isolation methods. A total isolation process can be used for isolating the capped poly(arylene ether) copolymer when the intrinsic viscosity (I.V.) is less than about 0.25 deciliters per gram (dL/g), as measured in chloroform at 25° C. As part of the total isolation, a portion of the solvent is preferably removed to reduce the solvent load on the total isolation equipment. Concentration of the copolymer containing solution is preferably done by reducing the pressure in a solvent flash vessel while preferably increasing the temperature of the copolymer containing solution. The isolated copolymer can be dried at a temperature that is below the softening temperature or $T_g$ of the capped poly(arylene ether) copolymer.

The composition includes the (poly)isocyanate compound and the capped poly(arylene ether) copolymer. Preferably, the composition includes 5 to 50 wt %, or 5 to 40 wt %, or 5 to 30 wt % of the capped poly(arylene ether) copolymer, based on the total weight of the composition.

The (poly)isocyanate compound of the composition can be 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

The capped poly(arylene ether) copolymer can also be a part of a composition that includes a blend of at least two capped poly(arylene ether) copolymers. Such blends can be prepared from individually prepared and isolated capped poly(arylene ether) copolymers. Alternatively, such blends may be prepared by reacting a single uncapped poly(arylene ether) copolymer with at least two different capping agents.

The composition can further include a polyol in addition to the capped poly(arylene ether). Polyols include polyether polyols prepared by reacting an initiator having 2 to 8 hydroxyl groups per molecule, specifically 3 to 8 hydroxyl groups per molecule, with an alkoxylating agent such as ethylene oxide, propylene oxide, or butylene oxide. Exemplary polyols include an ethoxylated saccharide, a propoxylated saccharide, a butoxylated saccharide, an ethoxylated glycerin, a propoxylated glycerin, a butoxylated glycerin, an ethoxylated diethanolamine, a propoxylated diethanolamine, a butoxylated diethanolamine, an ethoxylated triethanolamine, a propoxylated triethanolamine, a butoxylated triethanolamine, an ethoxylated trimethylolpropane, a propoxylated trimethylolpropane, a butoxylated trimethylolpropane, an ethoxylated erythritol, a propoxylated erythritol, a butoxylated erythritol, an ethoxylated pentaerythritol, a propoxylated pentaerythritol, a butoxylated pentaerythritol, an aliphatic polyester diol, an aromatic polyester polyol, polyethylene glycol, polypropylene glycol, butanediol, hexanediol, other $C_2$-$C_8$ glycols, or a combination thereof.

The composition can further include a blowing agent, preferably wherein the blowing agent is a physical blowing agent such as 1,1-difluoroethane, 1,1,1,2-tetrafluoroethane, pentafluoroethane, 1,1,1,3,3-pentafluoropropane, 1,1,1,3,3-pentafluorobutane, 2-bromopentafluoropropene, 1-bromopentafluoropropene, 3-bromopentafluoropropene, 3,4,4,5,5,5-heptafluoro-1-pentene, 3-bromo-1,1,3,3-tetrafluoropropene, 2-bromo-1,3,3,3-tetrafluoropropene, 1-bromo-2,3,3,3-tetrafluoropropene, 1,1,2,3,3,4,4-heptafluorobut-1-ene, 2-bromo-3,3,3-trifluoropropene, E-1-bromo-3,3,3-trifluoropropene-1, (Z)-1,1,1,4,4,4-hexafluoro-2-butene, 3,3,3-trifluoro-2-(trifluoromethyl)propene, 1-chloro-3,3,3-trifluoropropene, 2-chloro-3,3,3-trifluoropropene, 1,1,1-trifluoro-2-butene, or a combination thereof. The physical blowing agent, when used, may be present at 2 to 20 wt %, based on the total weight of the reaction mixture. Within this range, the physical blowing agent amount can be 2.5 to 15 wt %.

Chemical blowing agents include water and carboxylic acids that reaction with isocyanate groups to liberate carbon dioxide. When present, chemical blowing agents, and specifically water, can be used in an amount of 0.2 to 5 wt %, based on the total weight of the reaction mixture. Within this range, the chemical blowing agent amount can be 0.2 to 3 wt %.

The composition can further include a curing catalyst, such as urethane catalysts, isocyanurate catalysts, and combinations thereof. Preferably the curing catalyst is dimethylcyclohexylamine, benzyldimethylamine, N,N,N',N'',N''-pentamethyldiethylenetriamine, 2,4,6-tris-(dimethylaminomethyl)-phenol, triethylenediamine, N,N-dimethylethanolamine, potassium octoate (2-ethylhexanoate), potassium acetate, dibutyltin dilaurate, dibutlytin diacetate 2-hydroxpropyltrimethylammonium formate; N,N',N''-dimethylaminopropylhexahydrotriazine, or a combination thereof. The compositions can include a curing-effective amount of catalyst, for example 0.5 to 10 wt %, preferably 1 to 5 wt %, based on the total weight of the composition.

The composition can include a surfactant such as polyorganosiloxanes, polyorganosiloxane polyether copolymers, phenol alkoxylates (such as ethoxylated phenol), alkylphenol alkoxylates (such as ethoxylated nonylphenol), and combinations thereof. The surfactants can function as emulsifiers and/or foam stabilizers.

The composition can include flame retardants such as, for example, organophosphorous compounds such as organic phosphates (including trialkyl phosphates such as triethyl phosphate and tris(2-chloropropyl)phosphate, and triaryl phosphates such as triphenyl phosphate and diphenyl cresyl phosphate), phosphites (including trialkyl phosphites, triaryl phosphites, and mixed alkyl-aryl phosphites), phosphonates (including diethyl ethyl phosphonate, dimethyl methyl phosphonate), polyphosphates (including melamine polyphosphate, ammonium polyphosphates), polyphosphites, polyphosphonates, phosphinates (including aluminum tris (diethyl phosphinate); halogenated fire retardants such as tetrabromophthalate esters and chlorinated paraffins; metal hydroxides such as magnesium hydroxide, aluminum hydroxide, cobalt hydroxide, and hydrates of the foregoing metal hydroxide; and combinations thereof. The flame retardant can be a reactive type flame-retardant (including polyols which contain phosphorus groups, 10-(2,5-dihydroxyphenyl)-10H-9-oxa-10-phospha-phenanthrene-10-oxide, phosphorus-containing lactone-modified polyesters, ethylene glycol bis(diphenyl phosphate), neopentylglycol bis (diphenyl phosphate), amine- and hydroxyl-functionalized siloxane oligomers). These flame retardants can be used alone or in conjunction with other flame retardants.

The composition can include flame retardant synergists such as antimony pentoxide; antioxidants, surfactants, thermal and ultraviolet stabilizers, lubricants, anti-static agents, dyes, pigments, particulates, reinforcing materials and other constituents, or the like.

Those skilled in the art understand that there is a continuum between polyurethane and polyisocyanurate. Either or both can be prepared from the capped poly(arylene ether) copolymer, the optional polyol, and the isocyanate compound. Reaction mixtures used to prepare polyurethanes and polyisocyanurates are characterized by an isocyanate index, which is calculated according to the equation $$\text{Isocyanate Index} = \frac{Moles_{NCO}}{Moles_{OH} + Moles_{HOH} + Moles_{NH}} \times 100$$

wherein $Moles^{NCO}$ is the moles of isocyanate groups in the reaction mixture, $Moles_{OH}$ is the moles of OH groups in the reaction mixture from sources other than water (including OH groups from alcohols and carboxylic acids), $Moles_{HOH}$ is the moles of OH groups in the reaction mixture from water, and $Moles_{NH}$ is the moles of NH groups in the reaction mixture. In general, the reaction mixture is characterized by an isocyanate index of 105 to 350. When the reaction mixture molar ratio of isocyanate groups to hydroxyl groups is 1:1 and no water or NH groups are present in the reaction mixture, the isocyanate index is 100, and a "pure" polyurethane is formed. The products of reaction mixtures having an isocyanate index of 100 to 125, specifically 105 to 125, are typically characterized as polyurethanes, while the products of reaction mixtures having an isocyanate index of 180 to 350 are typically characterized as polyisocyanurates. Formation of isocyanurate groups is favored not only by high isocyanate indices, but also by use of catalysts for isocyanurate formation, such as N-hydroxyalkyl quaternary ammonium carboxylates.

When the composition further includes a blow agent, a polyurethane or polyisocyanurate foam can be prepared by thoroughly mixing the components together. The reaction starts after a brief period and progresses with heat development. The reaction mixture is continually expanded by the blowing gases released, until the reaction product reaches the solid state because of progressive cross-linkage, the foam structure being retained.

Also provided is a polyurethane product prepared from the composition, preferably wherein the product is a thermoplastic polyurethane, polyurethane foam, polyisocyanurate foam, or a combination thereof. To prepare the polyurethane or polyisocyanurate product, the capped poly (arylene ether) copolymer, the optional polyol, and the isocyanate compound, which have been optionally temperature controlled and provided with additives, are thoroughly mixed together until the reaction product reaches the solid state because of progressive cross-linkage. When a blowing agent is included, the reaction mixture is continually expanded by the blowing gases released and a foam structure is obtained.

The product can have an isocyanate index of 105 to 350, preferably 105 to 125 or 180 to 350.

Specific examples of articles that can utilize the polyurethane product, and in particular a polyurethane or polyisocyanurate foam, include thermal insulation materials such as domestic appliances (such as domestic and commercial refrigerators and freezers, and hot water tanks); building materials (such as wall and roofing panels, cut-to-size pieces from slab stock, and spray-in-place foam for insulation and sealing); thermally insulated tanks and containers, pipelines, heating pipes, cooling pipes, and cold stores; and thermally insulated refrigerated vehicles for road and rail including containers.

In a specific aspect, a polyurethane or a polyisocyanurate product is prepared from a composition including an isocyanate compound, a diol, and the capped poly(arylene ether) copolymer, wherein the capped poly(arylene ether) copolymer is prepared from the reaction of 2,6-dimethylphenol and 2,2-bis(3,5-dimethyl-4-hydroxyphenyl)propane to form the uncapped poly(arylene ether) copolymer, and the uncapped poly(arylene ether) copolymer is subsequently reacted with ethylene carbonate or propylene carbonate under conditions effective to provide the capped poly (arylene ether) copolymer.

In another specific aspect, a polyurethane or a polyisocyanurate product is prepared from a composition including an isocyanate compound, a diol, and the capped poly (arylene ether) copolymer, wherein the capped poly(arylene ether) copolymer is prepared from the reaction of 2,6-dimethylphenol and 2,2-bis(3,5-dimethyl-4-hydroxyphenyl) propane to form the uncapped poly(arylene ether) copolymer, and the uncapped poly(arylene ether) copolymer is subsequently reacted with ethylene carbonate or propylene carbonate under conditions effective to provide the capped poly(arylene ether) copolymer, and wherein the capped poly(arylene ether) copolymer is present in amount of 5 to 30 wt %, based on the total weight of the diol and the capped poly(arylene ether) copolymer.

In a specific aspect, the composition includes a capped poly(arylene ether) copolymer is a capped poly(phenylene ether) copolymer derived from an uncapped poly(phenylene ether) copolymer, wherein the uncapped poly(phenylene ether) copolymer is prepared from monomers comprising 2,6-dimethylphenol and 2,2-bis(3,5-dimethyl-4-hydroxyphenyl)propane, and wherein the uncapped poly(phenylene ether) copolymer has a hydroxyl equivalent weight of 700 to 1200 grams per equivalent (g/eq.), an average of 1.9 to 2.0 hydroxyl groups per molecule, and an intrinsic viscosity of 0.06 to 0.12 deciliters per gram (dL/g) as measured at 25° C. in chloroform.

A particular product, preferably a polyurethane foam product, can be prepared from the composition disclosed herein, wherein the product can have one or more of the following properties: a Shore D hardness of 45 to 90, or 50 to 80 according to ASTM D2240; a tensile stress at 100% elongation of 15 to 40 MPa, or 20 to 40 MPa according to ISO 527-1 and 527-2 (2012); a tensile stress at 300% elongation of 18 to 30 MPa, or 20 to 25 MPa according ISO 527-1 and 527-2 (2012); a tear strength of 1500 to 2500 Newtons per centimeter (N/cm), or 1600 to 2500 N/cm according to ASTM D 624-00; and a compressive strength of 5 to 15 MPa, or 6 to 10 MPa according to ASTM D 1621-00.

In a specific aspect, a polyurethane foam product is prepared from a composition including an isocyanate compound, a diol, and the capped poly(arylene ether) copolymer, wherein the capped poly(arylene ether) copolymer is prepared from the reaction of 2,6-dimethylphenol and 2,2-bis (3,5-dimethyl-4-hydroxyphenyl)propane to form the uncapped poly(arylene ether) copolymer, and the uncapped poly(arylene ether) copolymer is subsequently reacted with ethylene carbonate or propylene carbonate under conditions effective to provide the capped poly(arylene ether) copolymer, wherein the capped poly(arylene ether) copolymer is present in amount of 5 to 30 wt %, based on the total weight of the diol and the capped poly(arylene ether) copolymer, wherein the polyurethane foam product has one or more of the following properties: a Shore D hardness of 45 to 90, or 50 to 80 according to ASTM D2240; a tensile stress at 100% elongation of 15 to 40 MPa, or 20 to 40 MPa according to ISO 527-1 and 527-2 (2012); a tensile stress at 300% elongation of 18 to 30 MPa, or 20 to 25 MPa according ISO 527-1 and 527-2 (2012); a tear strength of 1500 to 2500 Newtons per centimeter (N/cm), or 1600 to 2500 N/cm according to ASTM D 624-00; and a compressive strength of 5 to 15 MPa, or 6 to 10 MPa according to ASTM D 1621-00.

This disclosure is further illustrated by the following examples, which are non-limiting.

EXAMPLES

Components used in the examples are summarized in Table 1.

TABLE 1

| Component | Description |
|---|---|
| PPE-2OH | A copolymer of 2,6-dimethylphenol and 2,2-bis(3,5-dimethyl-4- hydroxyphenyl)propane, CAS Reg. No. 1012321-47-9, having a hydroxyl equivalent weight of 924 grams per equivalent, an average of 1.92 hydroxyl groups per molecule, and an intrinsic viscosity of 0.09 deciliters per gram as measured at 25° C in chloroform; available as NORYL SA90 from SABIC. |
| Polyether Diol | Poly(oxytetramethylene) glycol, CAS Reg. No. 25190-06-1, having a hydroxyl equivalent weight of 524.8; titration of hydroxyl groups required 106.9 milligrams potassium hydroxide per gram glycol; available as TERATHANE 1000 from Invista. |
| Chain Extender | 1,4-butanediol, CAS Reg. No. 110-63-4. |

Weight average molecular weight ($M_w$) was measured by gel permeation chromatography (GPC) using polystyrene standards.

The chemical structures of the copolymers and the average degree of functionality were determined by nuclear magnetic resonance (NMR) spectroscopy. All $^1$H NMR spectra were acquired on a Varian Mercury Plus 400 instrument operating at an observe frequency of 400.14 MHz.

Shore D hardness was according to ASTM D2240.

Values of tensile stress at yield, expressed in units of megapascals (MPa), were determined at 23° C. according to ISO 527-1 and 527-2 using a test speed of 50 millimeters/minute (mm/min) and five samples per composition.

Tear strength was determined at 23° C. according to ASTM D 624-00, using an Instron Universal Tester, Model 1122, Die C, and a test speed of 50.8 cm/min.

Compressive strength was determined at 23° C. using ASTM D 1621-00 and a sample size of 5.08 cm×5.08 cm×2.54 cm and a head speed of 2.5 mm/min.

The solvent resistance was evaluated based on the swelling of the polyurethane samples after 72 hours of immersion at room temperature (ca. 23° C.) in each of toluene, methylethylketone (MEK), and isopropanol. The results are reported as an increase in mass (wt % increase) after exposure to the solvent.

Example 1

To a 4-neck round bottom flask fitted with a reflux condenser bearing a nitrogen inlet, mechanical stirrer, temperature probe and a rubber septum was charged 1250 milliliters (mL) of o-xylene. Then 1251.7 grams (g) of uncapped PPE-2OH copolymer powder was added slowly thereto with stirring. The uncapped PPE-2OH copolymer powder was rinsed into the flask with 40 mL of o-xylene and the mixture stirred overnight at room temperature to dissolve the reactants. The contents of the flask were subsequently heated to 60° C. and 5.000 g of KHCO$_3$ was added. PEG-400 was then added (2.5 mL) to help solubilize the KHCO$_3$. Subsequently 128.23 g of powdered ethylene carbonate was added to the flask and the temperature was raised to 120° C. to observe the formation of gas bubbles (CO$_2$). The temperature was slowly raised to 145° C. and maintained for 12 hours. Temperature was then increased to 152° C. to heat at reflux for 20 hours and the contents were allowed to cool to 60° C. The resulting material was diluted with 1300 mL of solvent, washed with 0.1 normal (N) aqueous HCl, and then dried by vacuum distillation. The viscous product was transferred to an aluminum pan and dried thoroughly in a vacuum oven at 110° C. The resulting capped PPE copolymer had a degree of endcapping that was 99+% based on the capping of terminal phenol groups of the uncapped PPE-2OH copolymer as determined by $^1$H-NMR and $^{31}$P-NMR analysis.

Example 2

To a 4-neck round bottomed flask fitted with a reflux condenser bearing a nitrogen inlet, mechanical stirrer, temperature probe and an addition funnel was charged 1000 mL of o-xylene. Then 850 g of uncapped PPE-2OH copolymer powder was added slowly with stirring. The uncapped PPE-2OH copolymer powder was rinsed into the flask with 30 mL of o-xylene and the mixture stirred overnight at room temperature to dissolve the reactants. The contents of the flask were subsequently heated to 50° C. and 3.61 g of KHCO$_3$ was added thereto. The contents were heated at reflux (148° C.) and PEG-400 was then added (1.5 mL) through the reflux condenser to help solubilize the KHCO$_3$. Subsequently 85 mL of propylene carbonate was slowly added to the flask through the addition funnel. The temperature was raised to 150° C. to observe the formation of gas bubbles (CO$_2$). The contents were heated at reflux for an additional 20 hours and then allowed to cool to room temperature. $^1$H-NMR and $^{31}$P-NMR analysis showed the degree of capping as about 60% although the propylene carbonate had been consumed.

To complete the capping reaction, an additional 3.116 g of ethylene carbonate was added to the reaction mixture. Gas evolution was observed shortly after the addition had begun and the resultant mixture was then heated at reflux for 13 hours. $^1$H-NMR and $^{31}$P-NMR NMR analysis revealed the degree of capping was 80%. An additional 3.045 g of ethylene carbonate were then added, and the contents were heated at reflux for 12 hours. NMR analysis showed the degree of capping was 88%. A further 3.295 g of ethylene carbonate and 1.012 g of KHCO$_3$ were then added to the reaction mixture, and the resultant heated at reflux for 6 hours. The reaction mixture was subsequently cooled to 50° C. then diluted with 700 mL of solvent. The solutions were transferred to a separatory funnel and washed with 0.1 N aqueous HCl and the solvent was removed by vacuum distillation. The resulting viscous product was transferred to an aluminum pan and dried thoroughly in vacuum oven at 110° C. The resulting capped PPE copolymer had a degree of endcapping that was 99+% based on the capping of terminal phenol groups of the uncapped PPE-2OH copolymer as determined by $^1$H-NMR and $^{31}$P-NMR analysis.

Preparation of Thermoplastic (Poly)Urethanes

Thermoplastic poly(urethane) (TPU) samples were prepared from a reaction mixture of methylene diphenyl isocyanate (MDI), a combination of a PPE copolymer and of the polyether diol (as shown in Table 2), and a chain extender. The reaction mixtures have an isocyanate index of 102.

Table 2 shows the identity of the PPE copolymers, the amount of PPE copolymers, the amount of polyether diol, and the wt % of PPE copolymers based on the total weight of the PPE copolymer, the polyether diol, MDI, and the chain extender.

Liquid isocyanate conditioned at 80° C. was added via syringe to the mixture, the resulting contents were mixed for 30 seconds at 2200 rpm using a Speed Mixer, and the resulting mixture was transferred into an aluminum mold that was preheated at 120° C. and covered with a polytetrafluorethylene sheet. At the gel time, the mold was closed and the TPUs were cured for 2 hours at 120° C. Afterwards, the TPU samples were post-cured for 20 hours at 100° C.

Table 3 shows the formulations and properties for the TPU samples.

TABLE 3

| | Units | CE 1 | CE 2 | E3 | E4 | CE3 | E5 | E6 |
|---|---|---|---|---|---|---|---|---|
| Hardness, Shore D | | 41.0 ± 0.9 | 47.7 ± 1.4 | 50.3 ± 2.5 | 57.2 ± 2.4 | 58.2 ± 2.0 | 62.7 ± 1.0 | 65.2 ± 1.5 |
| Tensile Stress at 100% elongation | MPa | 9.29 ± 0.5 | 14.07 ± 0.5 | 15.55 ± 0.8 | 16.89 ± 0.4 | 20.96 ± 0.8 | 21.11 ± 0.8 | 23.79 ± 0.4 |
| Tensile Stress at 300% elongation | MPa | 10.88 ± 0.7 | 18.09 ± 0.9 | 19.03 ± 1.0 | 21.21 ± 0.56 | — | — | — |
| Tear Strength | N/cm | 1102 ± 91 | 1316 ± 61 | 1762 ± 74 | 1569 ± 157 | 1660 ± 76 | 1716 ± 218 | 1902 ± 218 |
| Compressive Strength | MPa | 3.87 ± 0.2 | 5.24 ± 0.4 | 6.08 ± 0.2 | 6.50 ± 0.2 | — | — | — |
| Toluene Resistance | Δwt % | 86.8 ± 1.3 | 93.0 ± 3.4 | 85.9 ± 3.9 | 79.0 ± 2.6 | 103.1 ± 3.2 | 96.5 ± 1.8 | 79.1 ± 2.4 |
| MEK Resistance | Δwt % | 111.5 ± 4.3 | 95.7 ± 2.0 | 91.7 ± 2.0 | 81.1 ± 1.5 | 124.7 ± 5.9 | 90.3 ± 9.3 | 75.1 ± 1.3 |
| Isopropanol Resistance | Δwt % | 28.7 ± 0.6 | 22.2 ± 1.1 | 20.4 ± 0.8 | 18.4 ± 0.7 | 15.1 ± 0.2 | 15.2 ± 0.7 | 12.1 ± 0.6 |

TABLE 2

| | CE1 | CE2 | E3 | E4 | CE3 | E5 | E6 |
|---|---|---|---|---|---|---|---|
| PPE copolymer | none | PPE-2OH | E1 | E2 | PPE-2OH | E1 | E2 |
| Amount of PPE copolymer (wt %) | 0 | 10 | 10 | 10 | 20 | 20 | 20 |
| Amount of polyether diol (wt %) | 100 | 90 | 90 | 90 | 80 | 80 | 80 |
| wt % PPE total | — | 6.55 | 6.46 | 6.41 | 13.29 | 13.17 | 13 |

As shown in Table 2, Examples 3 and 5 included 10 wt % or 20 wt %, respectively, of the capped PPE copolymer prepared from ethyl carbonate of Example 1. Examples 4 and 6 included 10 wt % or 20 wt %, respectively, of the capped PPE copolymer prepared from propylene carbonate of Example 2. Comparative Example 1 (CE1) included the (poly)isocyanate and the diol but did not include a PPE copolymer. Comparative Example 2 (CE2) and Comparative Example 3 (CE3) included 10 wt % or 20 wt %, respectively, of the uncapped PPE-2OH copolymer.

Sheets and round bottom samples were prepared to test physico-mechanical properties of the TPU samples prepared from the reaction mixtures in Table 2. The samples were prepared using a laboratory compression molding method (Carver press). A degassed and preheated mixture of PPE copolymer, polyether diol, and chain extender were weighed into a speed mixing cup, mixed for 30 seconds at 2200 rpm using a Speed Mixer (FlackTek Inc.), and subsequently heated for 15 minutes in an air-circulating oven at 120° C.

As shown in Table 3, the Shore D hardness, tensile stress, tear strength, compressive strength, and solvent resistance were increased over CE1 by the use of 10 wt % of the uncapped PPE-2OH copolymer in CE2. Further increases in hardness, tensile stress, tear strength, compressive strength, and solvent resistance were achieved relative to CE2 by incorporation of the respective EC and PC capping groups, where the improvements in the noted properties correspond with the increased amounts of the capped PPE copolymer used in the TPU system.

This disclosure further encompasses the following aspects.

Aspect 1. A composition including a (poly)isocyanate compound and a capped poly(arylene ether) copolymer, wherein the capped poly(arylene ether) copolymer is derived from reacting a capping agent and an uncapped poly(arylene ether) copolymer comprising a phenolic end group, the uncapped poly(arylene ether) copolymer is the product of oxidative copolymerization of a monomer comprising a monohydric phenol, a dihydric phenol, or a combination thereof, and optionally a hydroxyaromatic terminated siloxane, and the capped poly(arylene ether) copolymer comprises an end group comprising an aliphatic alcohol.

Aspect 2. The composition of aspect 1, wherein the capped poly(arylene ether) copolymer is of formula (1) Q(J-D)$_y$, wherein Q is derived from the monohydric phenol or the dihydric phenol, and optionally the hydroxyaromatic terminated siloxane; J has a structure of formula (2) wherein $Q^{1a}$, $Q^{1b}$, $Q^2$, and e are as provided herein; D is the aliphatic alcohol capping group comprising a hydroxy group directly connected to an aliphatic carbon atom of the capping group, preferably wherein each D is independently substituted or unsubstituted $C_2$-$C_{30}$ hydroxyhydrocarbyl, substituted or unsubstituted $C_3$-$C_{30}$ hydroxyhydrocarbylcarbonyl, substituted or unsubstituted $C_4$-$C_{30}$ hydroxy-terminated poly($C_2$-$C_4$ alkylene ether), or $C_5$-$C_{30}$ hydroxy-terminated poly($C_2$-$C_4$ alkylene ether)carbonyl, with the proviso that the hydroxy group is directly connected to an aliphatic carbon atom; and y is 1 or 2, preferably 2.

Aspect 3. The composition of aspect 1 or 2, wherein the dihydric phenol of formula (3) wherein $R^1$, $R^2$, $R^3$, $R^4$, $R^a$, $R^b$, $R^c$, $R^d$, $R^e$, Y, and z are as provided herein; preferably wherein the dihydric phenol comprises 2,2-bis(3,5-dimethyl-4-hydroxyphenol)propane.

Aspect 4. The composition of any one of the preceding aspects, wherein the monohydric phenol is of formula (4) wherein $Q^{1a}$, $Q^{1b}$, $Q^2$ are as defined herein; preferably wherein $Q^{1a}$ is methyl, and $Q^{1b}$ is halogen, unsubstituted $C_1$-$C_{12}$ alkyl provided that the alkyl group is not tertiary alkyl, or unsubstituted $C_1$-$C_{12}$ aryl, more preferably wherein the monohydric phenol is 2,6-dimethylphenol, 2-methylphenol, 2,5-dimethylphenol, 2,3,6-trimethylphenol, 2-methyl-6-phenyl phenol, or a combination thereof.

Aspect 5. The composition of any one of the preceding aspects, wherein the hydroxyaromatic terminated siloxane is of formula (5) wherein $R^6$, $R^7$, $R^8$, E, and n are as provided herein.

Aspect 6. The composition of any one of the preceding aspects, wherein the capped poly(arylene ether) copolymer is of formula (6) or (7) wherein $R^1$, $R^2$, $R^3$, $R^4$, $R^a$, $R^b$, $R^c$, $R^d$, $R^e$, $Q^{1a}$, $Q^{1b}$, $Q^2$, Y, D, x', y', and z are as provided herein Aspect 7. The composition of aspect 6, wherein the capped poly(arylene ether) copolymer is of formula (7a) as provide herein, wherein each occurrence of D is independently $C_2$-$C_{20}$ hydroxyhydrocarbyl or $C_4$-$C_{20}$ hydroxy-terminated poly(ethylene ether).

Aspect 8. The composition of any one of the preceding aspects, wherein the capped poly(arylene ether) copolymer has a number average molecular weight of 200 to 2,500 grams per mole and a weight average molecular weight of 600 to 6,000 grams per mole, wherein number average molecular weight and weight average molecular weight are as determined by gel permeation chromatography.

Aspect 9. The composition of any one of the preceding aspects, wherein the capped poly(arylene ether) copolymer has an average of 1.5 to 5 hydroxy groups per molecule, preferably 1.5 to 3.1, and more preferably 1.5 to 2.1.

Aspect 10. The composition of any one of the preceding aspects, wherein the capped poly(arylene ether) copolymer has an intrinsic viscosity of 0.04 to 0.15 dL/g measured at 25° C. in chloroform, preferably 0.06 to 0.1 dL/g, more preferably 0.075 to 0.090 dL/g.

Aspect 11. The composition of any one of the preceding aspects, wherein the (poly)isocyanate compound comprises 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha', alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

Aspect 12. The composition of any one of the preceding aspects, further comprising one or more of: a polyol, preferably wherein the polyol is an ethoxylated saccharide, a propoxylated saccharide, a butoxylated saccharide, an ethoxylated glycerin, a propoxylated glycerin, a butoxylated glycerin, an ethoxylated diethanolamine, a propoxylated diethanolamine, a butoxylated diethanolamine, an ethoxylated triethanolamine, a propoxylated triethanolamine, a butoxylated triethanolamine, an ethoxylated trimethylolpropane, a propoxylated trimethylolpropane, a butoxylated trimethylolpropane, an ethoxylated erythritol, a propoxylated erythritol, a butoxylated erythritol, an ethoxylated pentaerythritol, a propoxylated pentaerythritol, a butoxylated pentaerythritol, an aliphatic polyester diol, an aromatic polyester polyol, or a combination thereof; or a blowing agent, preferably wherein the blowing agent is 1,1-difluoroethane, 1,1,1,2-tetrafluoroethane, pentafluoroethane, 1,1,1,3,3-pentafluoropropane, 1,1,1,3,3-pentafluorobutane, 2-bromopentafluoropropene, 1-bromopentafluoropropene, 3-bromopentafluoropropene, 3,4,4,5,5,5-heptafluoro-1-pentene, 3-bromo-1,1,3,3-tetrafluoropropene, 2-bromo-1,3,3,3-tetrafluoropropene, 1-bromo-2,3,3,3-tetrafluoropropene, 1,1,2,3,3,4,4-heptafluorobut-1-ene, 2-bromo-3,3,3-trifluoropropene, E-1-bromo-3,3,3-trifluoropropene-1, (Z)-1,1,1,4,4,4-hexafluoro-2-butene, 3,3,3-trifluoro-2-(trifluoromethyl) propene, 1-chloro-3,3,3-trifluoropropene, 2-chloro-3,3,3-trifluoropropene, 1,1,1-trifluoro-2-butene, or a combination thereof; or a catalyst, preferably wherein the curing catalyst is dimethylcyclohexylamine, benzyldimethylamine, N,N,N', N",N"-pentamethyldiethylenetriamine, 2,4,6-tris-(dimethylaminomethyl)-phenol, triethylenediamine, N,N-dimethylethanolamine, potassium octoate (2-ethylhexanoate), potassium acetate, dibutyltin dilaurate, dibutlytin diacetate 2-hydroxpropyltrimethylammonium formate; N,N',N"-dimethylaminopropylhexahydrotriazine, or a combination thereof.

Aspect 13. A process for forming the capped poly(arylene ether) copolymer of any one of the preceding aspects, the method comprising reacting the capping agent and the uncapped poly(arylene ether) copolymer comprising the phenolic end group under conditions effective to provide a reaction mixture comprising the capped poly(arylene ether) copolymer.

Aspect 14. The process of aspect 13, wherein the capping agent comprises one or more of formulas (10) to (13) wherein $R^9$ to $R^{23}$, X, a, b, c, and g are as provided herein.

Aspect 15. A product prepared from the composition of any one or more of the proceeding aspects, preferably wherein the product is a thermoplastic polyurethane, a polyurethane foam, a polyisocyanurate foam, or a combination thereof.

The compositions, methods, and articles can alternatively comprise, consist of, or consist essentially of, any appropriate materials, steps, or components herein disclosed. The compositions, methods, and articles can additionally, or alternatively, be formulated to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some aspects", "an aspect", and so forth, means that an element described in connection with the aspect is included in at least one aspect described herein, and may or may not be present in other aspects. In addition, it is to be understood that the described elements may be combined in any suitable manner in the various aspects. A "combination thereof" is open and includes any combination comprising at least one of the listed components or properties optionally together with a like or equivalent component or property not listed Unless specified to the contrary herein, all test standards are the most recent standard in effect as of the filing date of this application, or, if priority is claimed, the filing date of the earliest priority application in which the test standard appears. Unless defined otherwise, technical and scientific terms used herein have the same meaning as is commonly understood by one of skill in the art to which this application belongs. All cited patents, patent applications, and other references are incorporated herein by reference in their entirety. A term expressly defined in the application takes precedence over a conflicting term incorporated by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "hydrocarbon" refers to a compound including carbon and hydrogen; "hydrocarbyl" means a monovalent group formed by removing a hydrogen atom from a hydrocarbon; "hydrocarbylene" means a divalent group formed by removing two hydrogen atoms from a hydrocarbon, either two hydrogen atoms from one carbon atom or one hydrogen atom from each of two different carbon atoms. A hydrocarbyl and hydrocarbylene can be acyclic or cyclic groups, and/or can be linear or branched, and can include rings, ring systems, aromatic rings, and aromatic ring systems, which contain carbon and hydrogen.

"Alkyl" means a branched or straight chain, saturated aliphatic hydrocarbon group. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Alkenylene" means a divalent alkenyl group. "Carbonyl" means a divalent group of the formula —C(=O)—. "Oxo" refers to a divalent group of the formula —O—. "Cycloalkyl" means a monovalent saturated hydrocarbon ring group having one or more rings. "Cycloalkylene" means a divalent cycloalkyl group. "Cycloalkenyl" means a monovalent group having one or more rings and one or more carbon-carbon double bonds in the ring, wherein all ring members are carbon (e.g., cyclopentenyl and cyclohexenyl). "Aryl" means an aromatic hydrocarbon group containing the specified number of carbon atoms, such as phenyl, tropone, indanyl, or naphthyl. "Arylene" means a divalent aryl group. "Alkylaryl" means an aryl group substituted with an alkyl group. "Alkylaryloxy" means an aryloxy group substituted with an alkyl group. "Arylalkyl" means an alkyl group substituted with an aryl group (e.g., benzyl). "Arylalkoxy" means an alkyloxy group substituted with an aryl group. The prefix "halo" means a group or compound including one more of a fluoro, chloro, bromo, or iodo substituent. A combination of different halo groups (e.g., bromo and fluoro), or only chloro groups can be present. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl) a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkyl, a $C_{4-12}$ heterocycloalkyl, or a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a $C_2$ alkyl group substituted with a cyano group.

The prefix "hetero" means that the compound or group includes at least one member that is a heteroatom (e.g., 1, 2, or 3 heteroatom(s)) instead of carbon, wherein the heteroatom(s) is each independently N, O, S, Si, or P. As used herein, the term "heterohydrocarbyl" means a hydrocarbyl group containing at least one heteroatom instead of carbon. "Hydroxyhydrocarbyl" refers to group of the formula -hydrocarbyl-OH. "Hydrocarbyloxy" refers to a heterohydrocarbyl group of the formula —O-hydrocarbyl. "Hydrocarbylthio" refers to a heterohydrocarbyl group of the formula —S-hydrocarbyl. "Hydroxyhydrocarbylcarbonyl" refers to a group of the formula —C(=O)—Rx wherein RX is a hydroxy-terminated hydrocarbyl. "Hydroxy-terminated poly(C$_2$-C$_4$ alkylene ether)carbonyl" refers to a group of the formula —C(=O)—R$^y$ wherein R$^y$ is hydroxy-terminated poly(C$_2$-C$_4$ alkylene ether). "Hydroxyalkylaryl" refers to a group of the formula -aryl-alkyl-OH. "Hydroxyalkylarylcarbonyl" refers to a group of the formula —C(=O)-aryl-alkyl-OH. "Hydroxyarylalkyl" refers to a group of the formula -alkyl-aryl-OH. "Hydroxyarylalkylcarbonyl" refers to a group of the formula —C(=O)-alkyl-aryl-OH.

"Aliphatic alcohol" means a group or moiety having an aliphatic carbon atom directly connected to a hydroxy group (—OH). An "aliphatic carbon atom" is a carbon atom of an acyclic or a cyclic, saturated or unsaturated hydrocarbyl or hydrocarbylene, excluding an aromatic hydrocarbyl or aromatic hydrocarbylene.

While exemplary aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition comprising a (poly) isocyanate compound and a capped poly(arylene ether) copolymer, wherein
the capped poly(arylene ether) copolymer is derived from reacting a capping agent and an uncapped poly(arylene ether) copolymer comprising a phenolic end group,
the uncapped poly(arylene ether) copolymer is the product of oxidative copolymerization of a monomer comprising a monohydric phenol, a dihydric phenol, or a combination thereof, and optionally a hydroxyaromatic terminated siloxane, and
the capped poly(arylene ether) copolymer comprises an end group comprising an aliphatic alcohol; and
wherein the capped poly(arylene ether) copolymer is of formula (1)

$$Q(J-D)_y \qquad (1)$$

wherein
Q is derived from the monohydric phenol or the dihydric phenol, and optionally the hydroxyaromatic terminated siloxane; provided that if Q is derived from the dihydric phenol, the dihydric phenol is of formula (3)

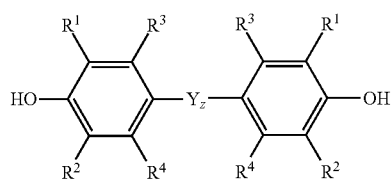

wherein each occurrence of $R^1$, $R^2$, $R^3$, and $R^4$ is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y is a divalent linking group of the formula

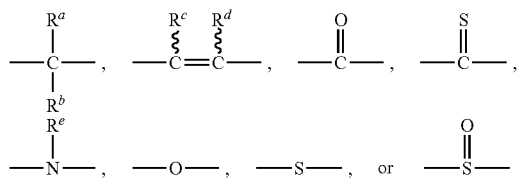

wherein each occurrence of $R^a$, $R^b$, $R^c$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^e$ and $R^d$ together are a $C_4$-$C_{12}$ cycloalkylene group;
J has a structure of formula (2)

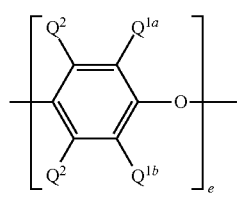

wherein
$Q^{1a}$ is $C_1$-$C_{12}$ primary or secondary alkyl;
$Q^{1b}$ is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms;
each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms;
e is 1 to 200;
D is the end group comprising the aliphatic alcohol, and y is 1 or 2.

2. The composition of claim 1, wherein each D is independently substituted or unsubstituted $C_2$-$C_{30}$ hydroxyhydrocarbyl, substituted or unsubstituted $C_3$-$C_{30}$ hydroxyhydrocarbylcarbonyl, substituted or unsubstituted $C_4$-$C_{30}$ hydroxy-terminated poly($C_2$-$C_4$ alkylene ether), or $C_5$-$C_{30}$ hydroxy-terminated poly($C_2$-$C_4$ alkylene ether) carbonyl, with the proviso that the hydroxy group is directly connected to an aliphatic carbon atom.

3. The composition of claim 1, wherein the monohydric phenol is of formula (4)

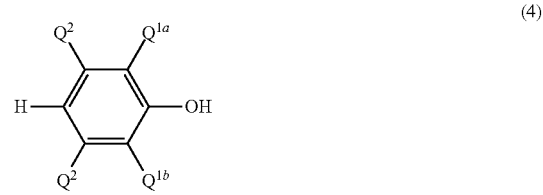

wherein,
$Q^{1a}$ is $C_1$-$C_{12}$ primary or secondary alkyl;
$Q^{1b}$ is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or
$C_2$-$C_{12}$ halohydrocarbyloxy wherein at least two carbon atoms separate the halogen and oxygen atoms; and
each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

4. The composition of claim 1, wherein the hydroxyaromatic terminated siloxane is of formula (5)

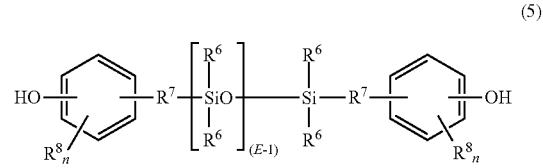

wherein
- each $R^6$ is independently hydrogen or a $C_{1-14}$ monovalent organic group;
- each $R^8$ is the same or different, and is a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ arylalkoxy, $C_{7-12}$ alkylaryl, or $C_{7-12}$ alkylaryloxy;
- each n is independently an integer of 0 to 4; and
- E is 2 to 200.

5. The composition of claim 1, wherein the capped poly(arylene ether) copolymer is of formula (6) or (7):

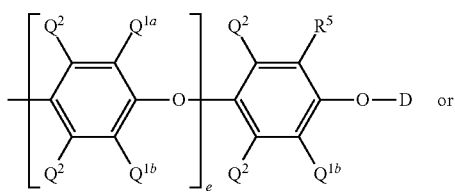

(6)

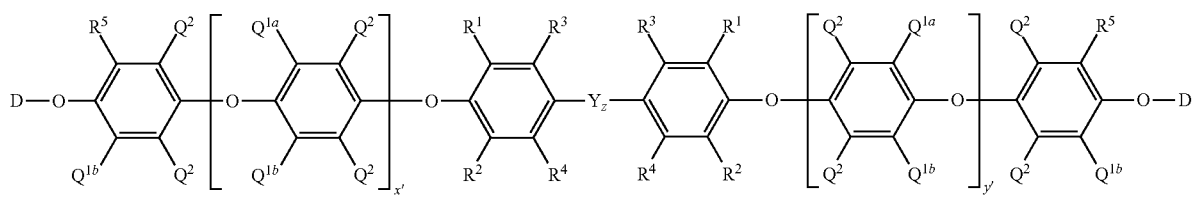

(7)

wherein
- each occurrence of $Q^{1a}$ is a $C_1$-$C_{12}$ primary or secondary alkyl;
- each occurrence of $Q^{1b}$ is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms;
- each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms;
- each occurrence of $R^1$, $R^2$, $R^3$, and $R^4$ is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy unless Y is a silicon-containing group, or $C_2$-$C_{12}$ halohydrocarbyloxy wherein at least two carbon atoms separate the halogen and oxygen atoms;
- each occurrence of $R^5$ is independently $Q^{1a}$ or a ($C_1$-$C_6$-hydrocarbyl) ($C_1$-$C_6$-hydrocarbyl)aminomethylene group;
- x' and y' are independently 0 to 50, provided that the sum of x' and y' is at least 2;
- z is 0 or 1;

Y is a divalent linking group of the formula

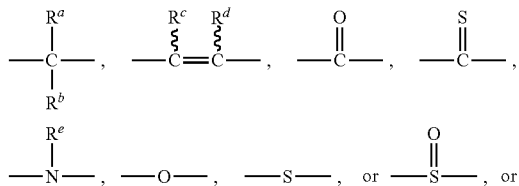

-continued $$\text{or} \quad -R^7 \begin{bmatrix} R^6 \\ | \\ SiO \\ | \\ R^6 \end{bmatrix}_{(E-1)} \begin{matrix} R^6 \\ | \\ Si-R^7- \\ | \\ R^6 \end{matrix}$$

wherein
- each occurrence of $R^a$, $R^b$, $R^c$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^c$ and $R^d$ together are a $C_4$-$C_8$ alkylene group,
- each occurrence of $R^6$ is independently hydrogen, a $C_{1-14}$ hydrocarbyl, a $C_{1-14}$ halohydrocarbyl, or a $C_{1-14}$ heterohydrocarbyl,
- each $R^7$ is a $C_{1-6}$ hydrocarbylene group, and
- E is 2 to 200; and each D is independently substituted or unsubstituted $C_2$-$C_{30}$ hydroxyhydrocarbyl, substituted or unsubstituted $C_3$-$C_{30}$ hydroxyhydrocarbylcarbonyl, substituted or unsubstituted $C_4$-$C_{30}$ hydroxy-terminated poly($C_2$-$C_4$ alkylene ether), or $C_5$-$C_{30}$ hydroxy-terminated poly ($C_2$-$C_4$ alkylene ether) carbonyl, with the proviso that the hydroxy group is directly connected to an aliphatic carbon atom.

6. The composition of claim 5, wherein the capped poly(arylene ether) copolymer is of formula (7a)

(7a)

[Chemical structure diagram showing a symmetric poly(arylene ether) structure with D—O— end groups, multiple aromatic rings with substituents R¹, R², R³, R⁴, R⁵, Q¹ᵃ, Q¹ᵇ, Q² and repeat units x' and y']

wherein each occurrence of D is independently $C_2$-$C_{20}$ hydroxyhydrocarbyl or $C_4$-$C_{20}$ hydroxy-terminated poly(ethylene ether).

7. The composition of claim 1, wherein the capped poly(arylene ether) copolymer has a number average molecular weight of 200 to 2,500 grams per mole and a weight average molecular weight of 600 to 6,000 grams per mole, wherein number average molecular weight and weight average molecular weight are as determined by gel permeation chromatography.

8. The composition of claim 1, wherein the capped poly(arylene ether) copolymer has an average of 1.5 to 5 hydroxy groups per molecule.

9. The composition of claim 1, wherein the capped poly(arylene ether) copolymer has an intrinsic viscosity of 0.04 to 0.15 deciliter per gram measured at 25° C. in chloroform.

10. The composition of claim 1, wherein the (poly) isocyanate compound comprises 1,4-tetramethylene diisocyanate, 1,6-hexamethylene diisocyanate, 2,2,4-trimethyl-1, 6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl) methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl) methane, alpha, alpha, alpha', alpha'-tetramethyl-1,3-xylylene diisocyanate, alpha, alpha, alpha', alpha'-tetramethyl-1,4-xylylene diisocyanate, 1-isocyanato-1-methyl-4 (3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenyl-methane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

11. The composition of claim 1, further comprising one or more of:
a polyol; or
a blowing agent; or
a catalyst.

12. A process for forming the capped poly(arylene ether) copolymer of claim 1, the method comprising reacting the capping agent and the uncapped poly(arylene ether) copolymer comprising the phenolic end group under conditions effective to provide a reaction mixture comprising the capped poly(arylene ether) copolymer wherein the capping agent comprises one or more compounds of formulas (10) to (13):

(10)
[Chemical structure: cyclic carbonate with R⁹, R¹⁰, R¹¹, R¹², R¹³, R¹⁴ substituents, subscript a]

(11)
[Chemical structure: X—C(R¹⁵)(R¹⁶)—[C(R¹⁷)(R¹⁸)]_g—[O—]_b—OH]

(12)
[Chemical structure: epoxide with R¹⁹]

(13)
[Chemical structure: β-lactone with R²⁰, R²¹, R²², R²³, subscript c]

wherein
$R^9$ to $R^{12}$, $R^{20}$, and $R^{21}$ are each independently hydrogen, $C_1$-$C_{12}$ primary alkyl, $C_{2-12}$ alkenyl, $C_7$-$C_{12}$ arylalkyl, $C_2$-$C_{12}$ alkoxyalkyl, $C_7$-$C_{12}$ aryloxyalkyl, or $C_1$-$C_{12}$ hydroxyalkyl;
each occurrence of $R^{13}$, $R^{14}$, $R^{22}$, and $R^{23}$ is independently hydrogen, $C_1$-$C_{12}$ primary alkyl, $C_7$-$C_{12}$ arylalkyl, $C_2$-$C_{12}$ alkoxyalkyl, $C_7$-$C_{12}$ aryloxyalkyl, or $C_1$-$C_{12}$ hydroxyalkyl;
each occurrence of $R^{15}$ to $R^{18}$ is independently hydrogen or methyl;
$R^{19}$ is hydrogen or $C_1$-$C_{18}$ primary alkyl;
X is halogen;
a is 0 or 1;
b is 0 to 10;
c is 0 to 3; and
g is 1 or 2.

13. A product prepared from the composition of claim 1.

14. The product of claim 13, wherein the product is a thermoplastic polyurethane, a polyurethane foam, a polyisocyanurate foam, or a combination thereof.

15. The composition of claim 1, wherein
$Q^{1a}$ is $C_1$-$C_{12}$ primary alkyl;
$Q^{1b}$ is $C_1$-$C_{12}$ alkyl;
each occurrence of $Q^2$ is hydrogen; and
e is 1 to 100.

16. The composition of claim 1, wherein each occurrence of $R^1$, $R^2$, $R^3$, and $R^4$ is independently hydrogen, halogen, or $C_1$-$C_{12}$ alkyl.

17. The composition of claim 11, wherein
the polyol is an ethoxylated saccharide, a propoxylated saccharide, a butoxylated saccharide, an ethoxylated glycerin, a propoxylated glycerin, a butoxylated glycerin, an ethoxylated diethanolamine, a propoxylated diethanolamine, a butoxylated diethanolamine, an ethoxylated triethanolamine, a propoxylated triethanolamine, a butoxylated triethanolamine, an ethoxylated trimethylolpropane, a propoxylated trimethylolpropane, a butoxylated trimethylolpropane, an ethoxylated erythritol, a propoxylated erythritol, a butoxylated erythritol, an ethoxylated pentaerythritol, a propoxylated pentaerythritol, a butoxylated pentaerythritol, an aliphatic polyester diol, an aromatic polyester polyol, polyethylene glycol, polypropylene glycol, butanediol, hexanediol, or a combination thereof; or
the blowing agent is 1,1-difluoroethane, 1,1,1,2-tetrafluoroethane, pentafluoroethane, 1,1,1,3,3-pentafluoropropane, 1,1,1,3,3-pentafluorobutane, 2-bromopentafluoropropene, 1-bromopentafluoropropene, 3-bromopentafluoropropene, 3,4,4,5,5,5-heptafluoro-1-pentene, 3-bromo-1,1,3,3-tetrafluoropropene, 2-bromo-1,3,3,3-tetrafluoropropene, 1-bromo-2,3,3,3-tetrafluoropropene, 1,1,2,3,3,4,4-heptafluorobut-1-ene, 2-bromo-3,3,3-trifluoropropene, E-1-bromo-3,3,3-trifluoropropene-1, (Z)-1,1,1,4,4,4-hexafluoro-2-butene, 3,3,3-trifluoro-2-(trifluoromethyl) propene, 1-chloro-3,3,3-trifluoropropene, 2-chloro-3,3,3-trifluoropropene, 1,1,1-trifluoro-2-butene, or a combination thereof; or
the curing catalyst is dimethylcyclohexylamine, benzyldimethylamine, N,N,N',N",N"-pentamethyldiethylenetriamine, 2,4,6-tris-(dimethylaminomethyl)-phenol, triethylenediamine, N,N-dimethylethanolamine, potassium octoate (2-ethylhexanoate), potassium acetate, dibutyltin dilaurate, dibutlytin diacetate 2-hydroxpropyltrimethylammonium formate; N,N',N"-dimethylaminopropylhexahydrotriazine, or a combination thereof.

18. The process of claim 12, wherein
each occurrence of $R^{15}$ to $R^{18}$ is hydrogen;
X is Br;
b is 0 to 6;
c is 1 to 3; and
g is 1.

19. The composition of claim 1, wherein the monomer comprises the monohydric phenol and the dihydric phenol and excludes the hydroxyaromatic terminated siloxane.

20. The composition of claim 1, wherein the monomer comprises the monohydric phenol and the hydroxyaromatic terminated siloxane.

* * * * *